United States Patent
Kiester et al.

(10) Patent No.: US 10,728,245 B2
(45) Date of Patent: Jul. 28, 2020

(54) HTTP PROXY AUTHENTICATION USING CUSTOM HEADERS

(71) Applicant: CA, Inc., San Jose, CA (US)

(72) Inventors: Winfield Scott Kiester, Lindon, UT (US); Nathan D. Toone, Layton, UT (US)

(73) Assignee: CA, INC., New York, NY (US)

(*) Notice: Subject to any disclaimer, the term of this patent is extended or adjusted under 35 U.S.C. 154(b) by 225 days.

(21) Appl. No.: 15/834,951

(22) Filed: Dec. 7, 2017

(65) Prior Publication Data
US 2019/0182250 A1    Jun. 13, 2019

(51) Int. Cl.
*H04L 29/06*    (2006.01)
*H04L 9/32*    (2006.01)
*H04L 29/08*    (2006.01)

(52) U.S. Cl.
CPC ........ *H04L 63/0884* (2013.01); *H04L 9/3213* (2013.01); *H04L 63/0428* (2013.01); *H04L 63/0807* (2013.01); *H04L 67/14* (2013.01); *H04L 67/02* (2013.01)

(58) Field of Classification Search
CPC .............. H04L 63/0884; H04L 9/3213; H04L 63/0428; H04L 63/0807; H04L 67/14; H04L 67/02
See application file for complete search history.

(56) References Cited

U.S. PATENT DOCUMENTS

| | | | | |
|---|---|---|---|---|
| 7,954,144 B1* | 5/2011 | Ebrahimi | ............... | H04L 63/102 709/227 |
| 9,172,753 B1 | 10/2015 | Jiang et al. | | |
| 9,231,949 B1* | 1/2016 | Jenkins | ............... | H04L 63/0807 |
| 9,716,701 B1 | 7/2017 | Wang | | |
| 2002/0109706 A1* | 8/2002 | Lincke | .................... | H04L 29/06 715/700 |
| 2004/0117493 A1* | 6/2004 | Bazot | ..................... | G06F 21/41 709/229 |

(Continued)

OTHER PUBLICATIONS

International Search Report and Written Opinion issued on PCT Application No. PCT/US2018/052730 dated Feb. 5, 2019, 21 pages.

(Continued)

*Primary Examiner* — Ghodrat Jamshidi
(74) *Attorney, Agent, or Firm* — Shook, Hardy & Bacon L.L.P.

(57) ABSTRACT

Hypertext Transfer Protocol (HTTP) proxy authentication using custom headers. In one embodiment, a method may include authenticating an HTTP session of a client, generating an authentication token that identifies the authenticated HTTP session, sending and intercepting an HTTP response with a custom header that includes the authentication token, caching the authentication token, intercepting one or more HTTP requests, adding the custom header that includes the authentication token to the HTTP requests, sending and intercepting the HTTP requests with the custom header that includes the authentication token, and, in response to intercepting at the proxy the custom header that includes the authentication token with the one or more HTTP requests, sending the one or more HTTP requests to one or more servers according to a policy corresponding to the authenticated HTTP session.

20 Claims, 4 Drawing Sheets

(56) References Cited

U.S. PATENT DOCUMENTS

| | | | |
|---|---|---|---|
| 2005/0108574 A1 | 5/2005 | Haenel et al. | |
| 2006/0230438 A1 | 10/2006 | Shappir et al. | |
| 2006/0277250 A1 | 12/2006 | Cherry et al. | |
| 2007/0073878 A1* | 3/2007 | Issa | H04L 67/104 709/225 |
| 2010/0293385 A1* | 11/2010 | Nanda | H04L 63/08 713/176 |
| 2011/0099277 A1* | 4/2011 | Yao | H04L 63/0884 709/226 |
| 2011/0265155 A1* | 10/2011 | Liu | H04L 63/0815 726/5 |
| 2012/0124384 A1* | 5/2012 | Livni | H04L 9/3247 713/178 |
| 2013/0005296 A1* | 1/2013 | Papakostas | H04L 67/303 455/405 |
| 2014/0331297 A1 | 11/2014 | Innes et al. | |
| 2015/0067807 A1* | 3/2015 | Williams | H04L 63/083 726/7 |
| 2015/0134956 A1* | 5/2015 | Stachura | H04L 63/0807 713/168 |
| 2015/0373015 A1* | 12/2015 | Mary | G06F 21/44 726/9 |
| 2016/0088022 A1* | 3/2016 | Handa | G06F 16/957 726/1 |
| 2018/0013839 A1* | 1/2018 | Noldus | H04L 67/34 |

OTHER PUBLICATIONS

Benseler, C; "Angular 4 (and Ionic 3): intercept http requests and add custom headers"; Jul. 31, 2017; retrieved from: https://medium.com/tabeless/angular-4-and-ionic-3-add-custom-headers-to-htto-requests-11aaf93798d9; 2 pages.

Progress Telerik; Telerik Fiddler; Web Page; 2017; accessed on Dec. 6, 2017; located at: https://www.telerik.com/fiddler; 3 pages.

Github Inc.; alphagov/ authenticating-proxy; Web Page; 2017; accessed on Dec. 6, 2017; located at: https:/github.com/alphagov/authenticating-proxy; 3 pages.

Symantec Corporation; Blue Coat Web Security Service; Version 6.10.2.x; Unified Agent Brief; Nov. 17, 2017; 69 pages.

Woods, Anthony; Granfana Labs; Granfana Authproxy: have it your way; Dec. 7, 2015; Web Page; accessed on Dec. 6, 2017; located at: https://grafana.com/blog/2015/12/07/grafana-authproxy-have-it-your-way/; 9 pages.

* cited by examiner

HTTP PROXY AUTHENTICATION USING CUSTOM HEADERS

BACKGROUND

A proxy server (also known as a proxy) acts as an intermediary for requests from a client seeking resources from a server. A client will typically connect to the proxy and request some resource from a server, such as a connection, a file, or a webpage. The proxy will then evaluate and handle the request according to its configuration. One task that a proxy may perform is the authentication of a user of a client. Once the user is authenticated, the proxy may manage traffic between the client and any server according to a security level of access previously designated for the user.

One difficulty with proxy authentication may arise where an authenticated user of a client attempts to communicate with multiple servers. This situation may require the proxy to interact with each of these servers, and may include the proxy redirecting traffic and using cookies, which can introduce significant delay in the traffic between the client and each server. Therefore, proxy authentication may impede the smooth and reliable flow of traffic between an authenticated user of a client and multiple servers.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for Hypertext Transfer Protocol (HTTP) proxy authentication using custom headers may be performed, at least in part, by a computing device including at least one processor. The method may include authenticating, at a proxy, an HTTP session of a client. The method may also include generating, at the proxy, an authentication token that identifies the authenticated HTTP session. The method may further include sending, from the proxy, and intercepting, at a local proxy application of the client, an HTTP response with a custom header that includes the authentication token. The method may further include caching, at the local proxy application of the client, the authentication token. The method may also include intercepting, at the local proxy application of the client, one or more HTTP requests. The method may further include adding, at the local proxy application of the client, the custom header that includes the authentication token to the HTTP requests. The method may also include sending, from the local proxy application of the client, and intercepting, at the proxy, the HTTP requests with the custom header that includes the authentication token. The method may further include, in response to intercepting at the proxy the custom header that includes the authentication token with the one or more HTTP requests, sending, from the proxy, the one or more HTTP requests to one or more servers according to a policy corresponding to the authenticated HTTP session.

In some embodiments, the method may be performed without employing any cookie, that includes the authentication token, at any of the one or more servers. In some embodiments, the one or more HTTP requests may be sent from the proxy without the proxy redirecting any of the one or more HTTP requests for authentication. In some embodiments, the method may be performed without the local proxy application performing authentication of the HTTP session. In some embodiments, the method may be performed without the local proxy application of the client storing user credentials used by a user to authenticate the HTTP session. In some embodiments, the one or more HTTP requests are encrypted and the method may be performed without the local proxy application decrypting the one or more HTTP requests.

Also, in some embodiments, the authenticating, at the proxy, of the HTTP session of the client may be performed using one or more of: an HTML form, Integrated Windows Authentication (IWA), X.509, Security Assertion Markup Language (SAML), Remote Authentication Dial-In User Service (RADIUS), and Lightweight Directory Access Protocol (LDAP).

Further, in some embodiments, the method may further include configuring the local proxy application of the client with a hostname and port number of the proxy. In some embodiments, the method may also include configuring proxy settings of the client to point to the local proxy application of the client.

Also, in some embodiments, one or more non-transitory computer-readable media may include one or more computer-readable instructions that, when executed by one or more processors, cause the one or more processors to perform a method for HTTP proxy authentication using custom headers.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
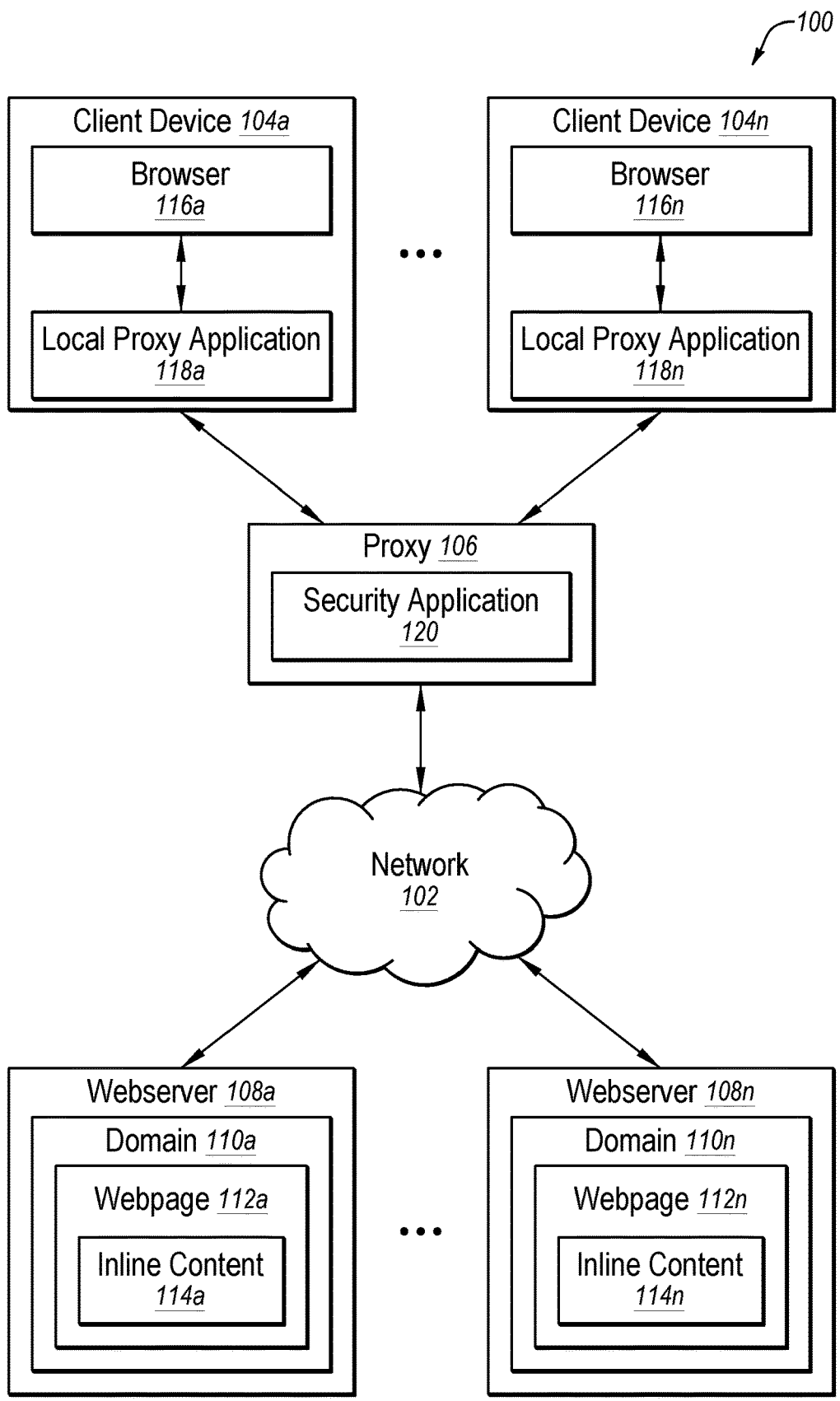
FIG. 1 illustrates an example system configured for HTTP proxy authentication using custom headers.

One task that an HTTP proxy may perform is authentication of a user of a client to create an authenticated HTTP session for the user. This type of HTTP proxy may be referred to as an authenticating HTTP proxy. Once a user is authenticated, the authenticating HTTP proxy may manage HTTP traffic between the client and a server according to policy, which may indicate a security level of access previously designated for the authenticated user and/or a level of logging or reporting of HTTP traffic for the authenticated user (e.g., to track what webpages the authenticated user has accessed).

One difficulty with an authenticating HTTP proxy arises where an authenticated user of a client attempts to communicate with multiple servers. For example, an authenticating HTTP proxy may be configured to perform HTTP authentication by setting an authentication cookie at each domain accessed by a client. In this situation, if a web browser application (also known as a browser) on the client attempts to access a webpage on one domain where the authentication cookie is set, but the webpage includes inline content of other domains where authentication cookies are not yet set, this may result in the authenticating HTTP proxy attempting to issue HTTP redirects and attempting to set cookies at the other domains. This may require the HTTP proxy to masquerade as an original content server (OCS), since an HTTP proxy is not expected to issue HTTP redirects or set cookies.

Further, unlike OCSs that may serve content for a single domain, an authenticating HTTP proxy may be required to authenticate traffic bound for many domains. This requirement may present a problem when using an authentication cookie to identify an authenticated HTTP session, since authentication cookies may need to be set separately at each of the multiple domains. The authenticating HTTP proxy may attempt to resolve this problem by redirecting such requests to a common domain, called a virtual URL. However, this redirecting to the virtual URL can cause the request to fail and result in a broken webpage.

Encrypted traffic, such as SSL/TLS traffic, may also be problematic because an authenticating HTTP proxy may not be configured to decrypt the encrypted traffic. Further, an HTTP connect request sent by a browser may not be configured to be redirected and may not be configured to contain cookies, and therefore this request may not be compatible for authentication by an authenticating HTTP proxy.

Further, even where an authenticating HTTP proxy is able to redirect traffic and set cookies, these activities may introduce significant delay in the HTTP traffic between a client and each server. Therefore, authentication performed by an authenticating HTTP proxy may impede the smooth and reliable flow of HTTP traffic between a client and multiple servers during an authenticated HTTP session.

Some embodiments disclosed herein may enable HTTP proxy authentication using custom headers. For example, instead of using authentication cookies to identify an authenticated HTTP session, embodiments disclosed herein may employ custom headers that include an authentication token that is added to each HTTP request from a client during the authenticated HTTP session. In these embodiments, once a proxy authenticates an HTTP session of a client, the proxy may generate an authentication token that identifies the authenticated HTTP session and send the authentication token in a custom header of an HTTP response. A local proxy application of the client may then intercept the HTTP response and cache the authentication token. Then, when the client sends any HTTP request during the authenticated HTTP session, the local proxy application may intercept the HTTP request, add the custom header that includes the authentication token, and send the HTTP request along to be intercepted by the proxy. Then, in response to intercepting the custom header that includes the authentication token with the HTTP requests, the proxy may use the authentication token to authenticate the HTTP request, and send the HTTP request to a server according to a policy corresponding to the authenticated HTTP session. In this manner, the embodiments disclosed herein may enable HTTP proxy authentication without the proxy employing any authentication cookie at any server, without the proxy redirecting any HTTP request for authentication after the initial authentication, and without the local proxy application performing authentication of the HTTP session or storing credentials used by a user to authenticate the HTTP session. Further, even where the HTTP requests are encrypted, the embodiments disclosed herein may enable HTTP proxy authentication without the local proxy application decrypting the HTTP requests. Thus, the embodiments disclosed herein may enable authentication performed by an authenticating HTTP proxy with less impact on the smooth and reliable flow of HTTP traffic between a client and multiple servers during an authenticated HTTP session.

Turning to the figures, FIG. 1 illustrates an example system 100 configured for HTTP proxy authentication using custom headers. The system 100 may include a network 102, client devices 104a-104n, a proxy 106, and webservers 108a-108n.

In some embodiments, the network 102 may be configured to communicatively couple the client devices 104a-104n, the proxy 106, and the webservers 108a-108n to one another using one or more network protocols, such as HTTP or other network protocols available in connection with the World Wide Web. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 3:
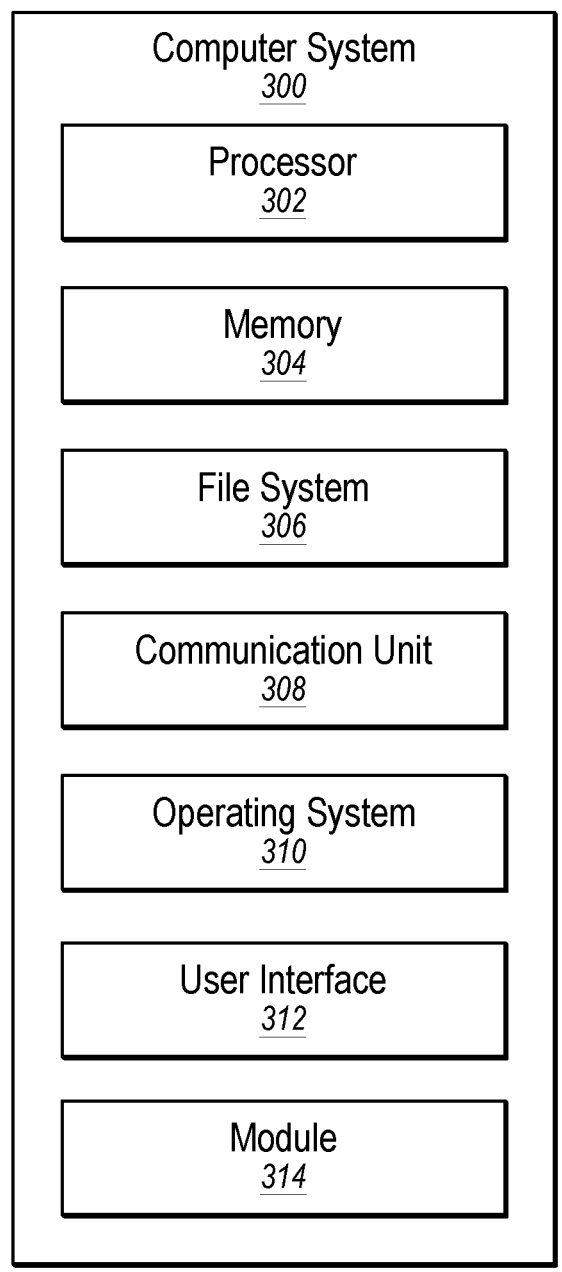
FIG. 3 illustrates an example computer system that may be employed in HTTP proxy authentication using custom headers.

In some embodiments, the webservers 108a-108n may be computer systems capable of communicating over the network 102 and capable of hosting webpages, other web documents, or web databases addressable at particular web domains, examples of which are disclosed herein in connection with the computer system 300 of FIG. 3. The webservers 108a-108n may be addressable on domains 110a-110n and may host webpages 112a-112n, respectively. The webpages 112a-112n may include inline content 114a-114n. The inline content 114a-114n may be content from other domains that may be hosted on other webservers.

In some embodiments, the client devices 104a-104n may be computer systems capable of communicating over the network 102 and capable of executing applications, examples of which are disclosed herein in connection with the computer system 300 of FIG. 3. The client devices 104a-104n may include and execute browsers 116a-116n and local proxy applications 118a-118n, respectively. The browsers 116a-116n may be applications configured to communicate with the webservers 108a-108n to download webpages and then display the webpages to users of the client devices 104a-104n. The local proxy applications 118a-118n may be configured to cooperate with the proxy 106 to enable HTTP proxy authentication using custom headers, as disclosed in greater detail in connection with FIGS. 2A-2B. In some embodiments, the local proxy applications 118a-118n may include, or be part of, a network security application, such as Symantec's Norton Safe Web application, Symantec's Norton Mobile Security application, or Symantec's Endpoint Protection application.

In some embodiments, the proxy 106 may be any computer system capable of communicating over the network 102 and capable of facilitating communication between the client devices 104a-104n and the webservers 108a-108n, examples of which are disclosed herein in connection with the computer system 300 of FIG. 3. In some embodiments, the proxy 106 may be an upstream authenticating HTTP proxy and be employed by an organization that manages and/or protects the network 102 and/or any of the client devices 104a-104n and/or any of the webservers 108a-108n. In some embodiments, the proxy 106 may include a security application 120. The security application 120 may be configured to cooperate with the local proxy applications 118a-118n to enable HTTP proxy authentication using custom headers, as disclosed in greater detail in connection with FIGS. 2A-2B. In some embodiments, the proxy 106 may include, or be part of, a proxy device, such as Symantec's ProxySG secure web gateway device.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2A:
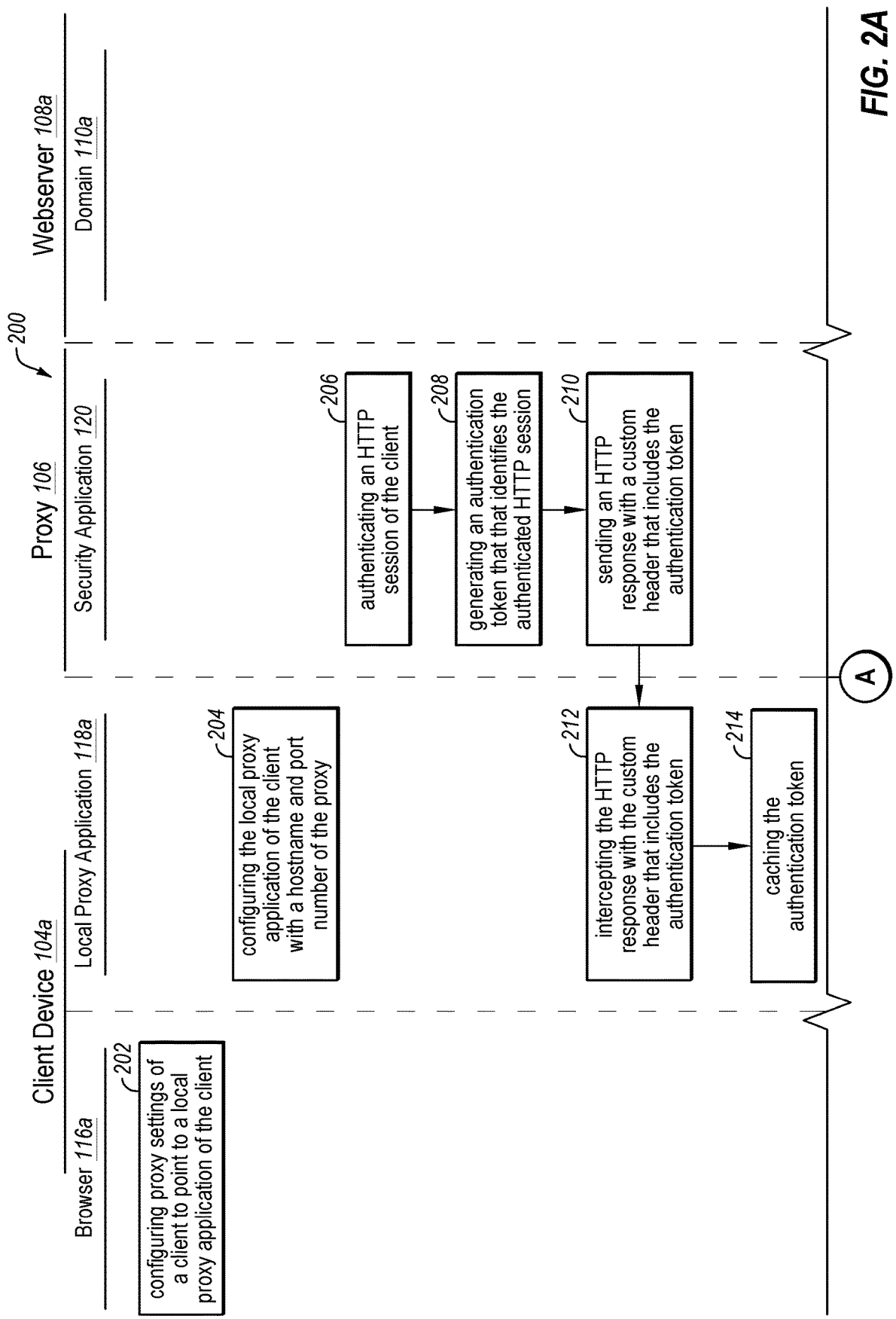
FIGS. 2A-2B are a flowchart of an example method for HTTP proxy authentication using custom headers.
Figure 2B:
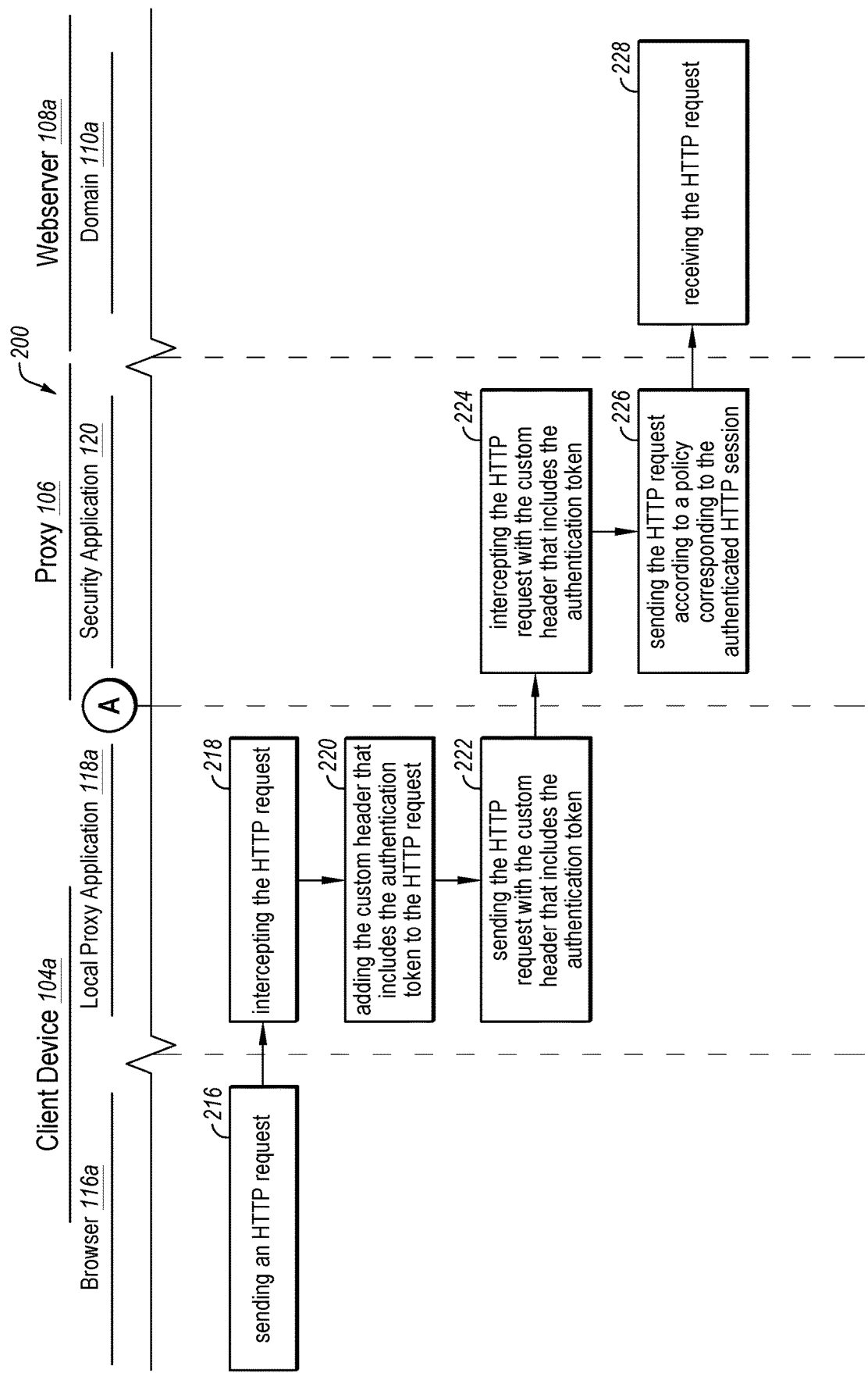

FIGS. 2A-2B are a flowchart of an example method 200 for HTTP proxy authentication using custom headers. The method 200 may be performed, in some embodiments, by a device or system, such as by the browser 116a and the local proxy application 118a executing on the client device 104a and/or by the security application 120 executing on the proxy 106 and/or by the webserver 108a of FIG. 1. In these and other embodiments, the method 200 may be performed by one or more processors based on one or more computer-readable instructions stored on one or more non-transitory computer-readable media. The method 200 will now be described in connection with FIGS. 1 and 2A-2B.

The method 200 may include, at action 202, configuring proxy settings of a client to point to a local proxy application of the client. For example, a user or a system administrator or an application may configure, at action 202, proxy settings of the client device 104a, using the browser 116a for example, to point to the local proxy application 118a of the client device 104a. In some embodiments, this configuring at action 202 of the proxy settings of the client device 104a may enable the local proxy application 118a to intercept HTTP network traffic between HTTP applications of the client device 104a, such as the browser 116a, and the proxy 106, and may allow the HTTP applications of the client device 104a to be seamlessly authenticated by the security application 120 of the proxy 106. The proxy settings of the client device 104a may be configured using an application other than the browser 116a, such as a settings application of the client device 104a.

The method 200 may include, at action 204, configuring the local proxy application of the client with a hostname and port number of the proxy. For example, a user or a system administrator or an application may configure, at action 204, the local proxy application 118a of the client device 104a with a hostname and port number of the proxy 106. In some embodiments, this configuring at action 204 of the local proxy application 118a may enable the local proxy application 118a to intercept HTTP traffic from HTTP applications of the client device 104a, such as the browser 116a, and then to forward the HTTP traffic to the proxy 106.

The method 200 may include, at action 206, authenticating an HTTP session of the client. In some embodiments, the authenticating of the HTTP session of the client may be performed using one or more of: an HTML form, IWA, X.509, SAML, RADIUS, and LDAP. For example, the security application 120 of the proxy 106 may authenticate, at action 206, an HTTP session of the client device 104a using an HTML form in which a user of the client device 104a is required to enter user credentials. In some embodiments, this authentication at action 206 may be performed by the security application 120 of the proxy 106 in response to the security application 120 of the proxy 106 intercepting an initial HTTP request from the browser 116a of the client device 104a to one of the webservers 108a-108n during an HTTP session. This initial HTTP request may be sent from the browser 116a when a user of the browser 116a first executes the browser 116a and attempts to access a website at a domain of a webserver, such as the domain 110a of the webserver 108a.

The method 200 may include, at action 208, generating an authentication token that identifies the authenticated HTTP session. In some embodiments, the authentication token may include a set of hash-based message authentication coded binary data that identifies the authenticated HTTP session. The authentication token, and potentially other identifying information of the authenticated HTTP session, may be stored at the proxy. For example, the security application 120 of the proxy 106 may generate, at action 208, an authentication token that identifies the authenticated HTTP session of the client device 104a, and this authentication token, and potentially other identifying information of the authenticated HTTP session, may be stored at the proxy 106, such as in RAM.

The method 200 may include, at action 210, sending and, at action 212, intercepting an HTTP response with a custom header that includes the authentication token. For example, the security application 120 of the proxy 106 may send, at action 210, and the local proxy application 118a of the client device 104a may intercept, at action 212, an HTTP response with a custom header (e.g., an HTTP X-header with an "X-" prefix) that includes the authentication token.

The method 200 may include, at action 214, caching the authentication token. For example, the local proxy application 118a of the client device 104a may cache, at action 214, the authentication token in a storage on the client device 104a, such as in RAM.

The method 200 may include, at action 216, sending an HTTP request and, at action 218, intercepting the HTTP request. For example, the browser 116a of the client device 104a may send, at action 216, an HTTP request and the local proxy application 118a of the client device 104a may intercept, at action 218, the HTTP request. In this example, the HTTP request may be a request by the browser 116a to access the webpage 112a at the domain 110a on the webserver 108a.

The method 200 may include, at action 220, adding the custom header that includes the authentication token to the HTTP request. For example, the local proxy application 118a of the client device 104a may access the authentication token that was previously cached at action 214 and add, at action 220, the custom header that includes the authentication token to the HTTP request.

The method 200 may include, at action 222, sending and, at action 224, intercepting the HTTP request with the custom header that includes the authentication token. For example, the local proxy application 118a of the client device 104a may send, at action 222, and the security application 120 of the proxy 106 may intercept, at action 224, the HTTP request with the custom header that includes the authentication token.

The method 200 may include, at action 226, sending the HTTP request according to a policy corresponding to the authenticated HTTP session and, at action 228, receiving the HTTP request. In some embodiments, the action 226 may be performed in response to intercepting the custom header that includes the authentication token with the HTTP request at action 224. In some embodiments, the HTTP request may be sent from the proxy without the proxy redirecting the HTTP request for authentication. For example, the security application 120 of the proxy 106 may analyze, between the actions 224 and 226, the custom header that includes the authentication token that was intercepted in the HTTP request in order to authenticate the HTTP request without issuing an HTTP redirect. Based upon this analysis, the security application 120 may identify the authentication HTTP session, and then access a policy for the authenticated session (which may be a policy corresponding to a particular authenticated user of the authenticated HTTP session) and then handle the HTTP request according to the policy. The policy may indicate, for example, a security level assigned to the authenticated user to control which domains the authenticated user may access. The policy may further indicate, for example, what HTTP network traffic should be logged and or reported for the authenticated user (e.g., in order to track what webpages and/or domains the authenticated user has accessed). For example, if the HTTP request is directed to the domain 110a of the webserver 108a, and if the policy for the particular authenticated user of the authenticated HTTP session indicates that the authenticated user has been assigned a security level that allows the authenticated user to access the domain 110a of the webserver 108a from the browser 116a of the client device 104a, the security application 120 may send, at action 226, the HTTP request to the webserver 108a according to the policy, and the webserver 108a may receive, at action 228, the HTTP request. In this example, the security application 120 of the proxy 106 may send the HTTP request to the webserver 108a without the security application 120 redirecting the HTTP request for authentication because the custom header that includes the authentication token indicates that the HTTP session has been authenticated previously and does not need to be authenticated again.

In some embodiments, the HTTP request sent at action 222 may be encrypted and the method 200 may be performed without the local proxy application or the proxy decrypting the HTTP request. For example, where the payload of the HTTP request sent by the browser 116a at action 222 is encrypted, the custom header that includes the authentication token may be added at action 222 and then accessed and analyzed by the local proxy application 118a between the actions 224 and 226 without any need to decrypt the payload of the HTTP request. This may enable the security application 120 of the proxy 106 to authenticate SSL/TLS connections without acting as a man-in-the-middle. Adding the custom header that includes the authentication token to an HTTP connect request, which the client device 104a may send prior to setting up an SSL tunnel, may allow the security application 120 of the proxy 106 to authenticate an underlying TCP connection before an SSL tunnel has been established. Alternatively, in some embodiments, the local proxy application may be configured as a transparent proxy. In this configuration, the local proxy application may be configured to capture all HTTP network traffic using a kernel module or similar mechanism. In these embodiments, because a browser may only send an HTTP connect request if the browser is configured to use a proxy, there may be no unencrypted HTTP request to which the local proxy application could add a custom header that includes the authentication token. Therefore, this configuration may allow all the previously-described functionality, except the authentication of SSL requests.

In some embodiments, the local proxy application may be configured to work with Web Proxy Auto Detection (WPAD) and Proxy Auto Configuration (PAC) files. In some example embodiments, the local proxy application may be configured to intercept HTTP requests from a client and return its own pre-configured PAC file that points to itself as the proxy server. In other example embodiments, the proxy settings of the client may point to the local proxy application, and the local proxy application could perform WPAD and retrieve a PAC file to determine the location of the upstream authenticating HTTP proxy.

In some embodiments, the method 200 may be performed without employing any cookie, that includes the authentication token, at any server. For example, the local proxy application 118a of the client device 104a and the security application 120 of the proxy 106 may employ the custom header that includes the authentication token in HTTP requests instead of using an authentication cookie on any of the webservers 108a-108n.

In some embodiments, the method 200 may be performed without the local proxy application performing authentication of the HTTP session. In some embodiments, the method 200 may be performed without the local proxy application of the client storing user credentials used by a user to authenticate the HTTP session. For example, the local proxy application 118a of the client device 104a may perform various actions of the method 200 without the local proxy application 118a performing authentication of the HTTP session because the authentication token that was cached at action 214 indicates that the HTTP session was previously authenticated by the security application 120 of the proxy 106. Thus, the local proxy application 118a of the client device 104a may not have any need to store user credentials used by a user to authenticate the HTTP session.

In some embodiments, the method 200 may be performed without any redirects due to an HTTP request that includes inline content. For example, the local proxy application 118a of the client device 104a and the security application 120 of the proxy 106 may handle an HTTP request for the webpage 112a that includes inline content 114a without needing to issue any HTTP redirect to handle the inline content 114a.

The method 200 may thus be employed to enable HTTP proxy authentication using custom headers. Some embodiments of the method 200 may enable may enable authentication performed by the proxy 106 with less impact on the smooth and reliable flow of HTTP traffic between the client device 104a and the webservers 108a-108n during an authenticated HTTP session.

Although the actions of the method 200 are illustrated in FIGS. 2A-2B as discrete actions, various actions may be divided into additional actions, combined into fewer actions, reordered, expanded, or eliminated, depending on the desired implementation. For example, in some embodiments, actions 206-228 may be employed without performing action 202 and/or action 204. Also, in some embodiments, actions 206-210 and 224-226 may be performed without performing the other actions of the method 200. Further, in some embodiments, actions 212-214 and 218-222 may be performed without performing the other actions of the method 200. Also, in some embodiments, any of actions 202, 204, 216, and 228 may be performed by an entity that is different from the entity or entities performing the other actions of the method 200.

In addition, although several of the actions of the method 200 are illustrated in FIGS. 2A-2B as being performed by the local proxy application 118a that is separate from the browser 116a, it is understood that in some embodiments, these action may instead be performed by a local proxy application that is implemented to function with, or be part of, the browser 116a, such as where a local proxy application is implemented as a browser plugin or as part of a browser itself. Therefore, these actions of the method 200 may be performed by a local proxy application that is not a separate HTTP proxy server.

Further, it is understood that the method 200 may improve the functioning of a network environment. For example, the functioning of any of the client devices 104a-104n, the proxy 106, and the webservers 108a-108n of FIG. 1 may itself be improved by the method 200. For example, any of these computer systems may be improved by HTTP proxy authentication using custom headers. The method 200 may be more effective than conventional methods which employ the setting of authentication cookies at each domain visited and/or frequent redirecting to accomplish authentication.

Also, the method 200 may improve the technical field of HTTP proxy authentication. Performing HTTP proxy authentication using custom headers is an improvement over conventional methods that use authentication cookies because using custom headers results in less impact on the smooth and reliable flow of HTTP traffic between a client and multiple servers during an authenticated HTTP session.

FIG. 3 illustrates an example computer system 300 that may be employed in HTTP proxy authentication using custom headers. In some embodiments, the computer system 300 may be part of any of the systems or devices described in this disclosure. For example, the computer system 300 may be part of any of the client devices 104a-104n, the proxy 106, and the webservers 108a-108n of FIG. 1.

The computer system 300 may include a processor 302, a memory 304, a file system 306, a communication unit 308, an operating system 310, a user interface 312, and a module 314, which all may be communicatively coupled. In some embodiments, the computer system may be, for example, a desktop computer, a client computer, a server computer, a mobile phone, a laptop computer, a smartphone, a smartwatch, a tablet computer, a portable music player, a router, a proxy, or any other computer system.

Generally, the processor 302 may include any suitable special-purpose or general-purpose computer, computing entity, or processing device including various computer hardware or software modules and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more of the actions of the method 200 of FIGS. 2A-2B.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more of the actions of the method 200 of FIGS. 2A-2B. These computer-executable instructions may be included, for example, in the operating system 310, in one or more applications, such as the module 314, or in some combination thereof.

The communication unit 308 may include any component, device, system, or combination thereof configured to transmit or receive information over a network, such as the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The module 314 may be one or more computer-readable instructions stored on one or more non-transitory computer-readable media, such as the memory 304 or the file system 306, that, when executed by the processor 302, is configured to perform one or more of the actions of the method 200 of FIGS. 2A-2B. In some embodiments, the module 314 may be part of the operating system 310 or may be part of an application of the computer system 300, or may be some combination thereof. In some embodiments, the module 314 may function as any of the browser 116a-116n, the local proxy applications 118a-118n, or the security application 120 of FIG. 1.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 302 of FIG. 3) including various computer hardware or software modules, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for HTTP proxy authentication using custom headers, at least a portion of the method being performed by a computing device comprising at least one processor, the method comprising:
   authenticating, at a proxy, an HTTP session of a client;
   generating, at the proxy, an authentication token that identifies the authenticated HTTP session;
   sending, from the proxy and to the client, an HTTP response with a custom header that includes the authentication token;
   intercepting, at the proxy and from the client, one or more HTTP requests with the custom header that includes the authentication token; and
   in response to intercepting, at the proxy, the custom header that includes the authentication token with the one or more HTTP requests, sending, from the proxy, the one or more HTTP requests to one or more servers according to a policy corresponding to the authenticated HTTP session.

2. The method of claim 1, wherein the method is performed without employing any cookie that includes the authentication token at any of the one or more servers.

3. The method of claim 1, wherein the one or more HTTP requests are sent from the proxy without the proxy redirecting any of the one or more HTTP requests for authentication.

4. The method of claim 1, wherein the authenticating, at the proxy, of the HTTP session of the client is performed using one or more of: an HTML form, IWA, X.509, SAML, RADIUS, and LDAP.

5. A computer-implemented method for HTTP proxy authentication using custom headers, at least a portion of the method being performed by a computing device comprising at least one processor, the method comprising:
intercepting, at a local proxy application of a client and from a proxy, an HTTP response with a custom header that includes an authentication token, the authentication token identifying an authenticated HTTP session of the client;
caching, at the local proxy application of the client, the authentication token;
intercepting, at the local proxy application of the client, one or more HTTP requests;
adding, at the local proxy application of the client, the custom header that includes the authentication token to the HTTP requests; and
sending, from the local proxy application of the client and to the proxy, the HTTP requests with the custom header that includes the authentication token to enable the proxy to send the one or more HTTP requests to one or more servers according to a policy corresponding to the authenticated HTTP session.

6. The method of claim 5, wherein the method is performed without employing any cookie that includes the authentication token at any of the one or more servers.

7. The method of claim 5, wherein the method is performed without the local proxy application of the client storing user credentials used by a user to authenticate the HTTP session.

8. The method of claim 5, wherein the method is performed without the local proxy application performing authentication of the HTTP session.

9. The method of claim 5, wherein:
the one or more HTTP requests are encrypted; and
the method is performed without the local proxy application decrypting the one or more HTTP requests.

10. The method of claim 5, wherein the one or more HTTP requests are sent from the proxy without the proxy redirecting any of the one or more HTTP requests for authentication.

11. The method of claim 5, further comprising configuring the local proxy application of the client with a hostname and port number of the proxy.

12. The method of claim 5, further comprising configuring proxy settings of the client to point to the local proxy application of the client.

13. The method of claim 5, wherein authentication of the HTTP session of the client is performed at the proxy using one or more of: an HTML form, IWA, X.509, SAML, RADIUS, and LDAP.

14. A computer-implemented method for HTTP proxy authentication using custom headers, at least a portion of the method being performed by a computing device comprising at least one processor, the method comprising:
authenticating, at a proxy, an HTTP session of a client;
generating, at the proxy, an authentication token that identifies the authenticated HTTP session;
sending, from the proxy, and intercepting, at a local proxy application of the client, an HTTP response with a custom header that includes the authentication token;
caching, at the local proxy application of the client, the authentication token;
intercepting, at the local proxy application of the client, one or more HTTP requests;
adding, at the local proxy application of the client, the custom header that includes the authentication token to the HTTP requests;
sending, from the local proxy application of the client, and intercepting, at the proxy, the HTTP requests with the custom header that includes the authentication token; and
in response to intercepting, at the proxy, the custom header that includes the authentication token with the one or more HTTP requests, sending, from the proxy, the one or more HTTP requests to one or more servers according to a policy corresponding to the authenticated HTTP session.

15. The method of claim 14, wherein the method is performed without employing any cookie that includes the authentication token at any of the one or more servers.

16. The method of claim 14, wherein the one or more HTTP requests are sent from the proxy without the proxy redirecting any of the one or more HTTP requests for authentication.

17. The method of claim 14, wherein:
the method is performed without the local proxy application performing authentication of the HTTP session; and
the method is performed without the local proxy application of the client storing user credentials used by a user to authenticate the HTTP session.

18. The method of claim 14, wherein:
the one or more HTTP requests are encrypted; and
the method is performed without the local proxy application decrypting the one or more HTTP requests.

19. The method of claim 14, further comprising configuring the local proxy application of the client with a hostname and port number of the proxy to enable the local proxy application of the client to intercept HTTP traffic between the proxy and the client.

20. The method of claim 14, further comprising configuring proxy settings of the client to point to the local proxy application of the client.

* * * * *